UNITED STATES PATENT OFFICE.

CLARENCE W. BALKE, OF HIGHLAND PARK, ILLINOIS, ASSIGNOR TO PFANSTIEHL COMPANY, INC., OF NORTH CHICAGO, ILLINOIS, A CORPORATION OF NEW YORK.

METHOD OF DEHYDRATING CHLORIDS.

1,289,079.   Specification of Letters Patent.   Patented Dec. 31, 1918.

No Drawing.   Application filed September 20, 1917.   Serial No. 192,290.

*To all whom it may concern:*

Be it known that I, CLARENCE W. BALKE, a citizen of the United States, residing at Highland Park, in the county of Lake and State of Illinois, have invented a certain new and useful Improvement in Methods of Dehydrating Chlorids, of which the following is a full, clear, concise, and exact description.

My invention relates to a method of producing anhydrous chlorids.

Certain chlorids, such as those of the rare earths, cannot be completely dehydrated by mere heating because of decomposition or hydrolysis which occurs in the presence of the released moisture.

In order that the metals may be separated from chlorids of this character, by the electrolysis method, every trace of water must be removed before it is attempted to melt the salt to form the electrolysis bath. The process herein described, more particularly with reference to the chlorids of the rare earth metals, is also applicable to many other metallic salts.

To a solution of the metallic chlorids ammonium chlorid is added to an amount substantially equal to fifteen per cent. of the metallic chlorids contained in the solution. This resultant mixture of metallic chlorids and ammonium chlorid is then evaporated to dryness by heating to a final temperature of somewhat more than 100 degrees C. This mass is then stirred during cooling, until it is solidified. It is then crushed into small pieces about the size of a pea, and introduced into a drying oven. The drying is continued in the oven until as much of the water of hydration has been expelled as can be driven off at temperatures not greatly exceeding 100 degrees C.

In order now to completely dehydrate the material it is introduced into a long round tube of quartz, stone-wear, carborundum, or some other suitable refractory material into which is passed a stream of pure dry HCL gas (hydrogen chlorid). The tube is heated throughout its length, the heat being very moderate at first so as not to expel the moisture too rapidly, but toward the end of the operation it is heated to a dull red. The tube is preferably rotated either continuously or intermittently so as to stir the material to bring all portions into intimate contact with the hydrogen chlorid being passed through the tube. The stream of hydrogen chlorid is continued during the entire heating process, and the ammonium chlorid is nearly all volatilized. The heating is continued until no more fumes of ammonium chlorid escape from the end of the tube. By this process the anhydrous metallic chlorid is produced in the form of porous particles, the ammonium chlorid having volatilized and having left the chunks of metallic chlorid in a porous state, the pores serving as means by which the hydrogen chlorid may come intimately in contact with every particle of metallic chlorid in the mixture.

The foregoing method may be carried out on a large scale, that is, with large quantities of material, in a satisfactory manner, whereas dehydration of certain chlorids, particularly the rare earth chlorids, cannot be readily carried out on a large scale by the use of ammonium chlorid alone. Furthermore, when it is attempted to dehydrate rare earth chlorids by the use of hydrogen chlorid alone, it is found that the surface only of large crystals or chunks of salt become dehydrated, while the interior, to which the hydrogen chlorid does not penetrate, does not become entirely freed of moisture.

The foregoing process is particularly useful in the production of metallic cerium and other rare earth metals, though it is to be understood that the scope of the invention is not confined to these metals, but is applicable to many others as well.

Having thus described my invention, what I claim as new and desire to secure by Letters Patent of the United States is:

1. The method of dehydrating metallic chlorids which consists in mixing a solution of the chlorid with ammonium chlorid, evaporating to dryness, and heating the salt in the presence of hydrogen chlorid.

2. The process of producing anhydrous chlorid of a metal whose chlorid can not be dehydrated by heating alone, due to hydrolysis, which consists in adding ammonium chlorid to a solution of the metallic chlorid, evaporating to dryness, and heating in the presence of hydrogen chlorid.

3. The process of dehydrating rare earth chlorids which consists in heating the mixture of the rare earth chlorids and ammonium chlorid in the presence of hydrogen chlorid and in agitating the chlorids while hot.

4. The method of producing anhydrous rare earth chlorids which consists in adding ammonium chlorid to a solution of the rare earth chlorids to an amount equal to substantially fifteen per cent. by weight of the rare earth chlorids contained in the solution, crystallizing out the mixed chlorids, evaporating to dryness, and slowly raising the temperature to substantially red heat in the presence of a moving current of hydrogen chlorid, until all of the ammonium chlorid has been driven off.

5. The method of dehydrating a metallic chlorid which comprises mixing a solution of the chlorid with a soluble material, evaporating the mixture to dryness, and heating it in a current of hydrogen chlorid, the said material being a solid at ordinary temperatures, volatile at the temperature to which the mixture is heated, and non-reactive with the metallic chlorid.

6. The method of dehydrating a metallic chlorid which comprises mixing a solution of the chlorid with a material that is solid at ordinary temperatures, volatilizes at the temperature to which the mixture is heated, and non-reactive with the metallic chlorid, evaporating the mixture to dryness, and heating it in a current of hydrogen chlorid.

7. The method of dehydrating a metallic chlorid which comprises mixing a solution of the chlorid with a material that is solid at ordinary temperatures, volatilizes at the temperature to which the mixture is heated, and non-reactive with the metallic chlorid, evaporating the mixture to dryness, and heating it in a current of fluid having an affinity for water.

8. The method of dehydrating metallic chlorids which consists in mixing a solution of the chlorid with ammonium chlorid, evaporating to dryness, and heating the mixture in a current of hydrogen chlorid.

9. The method of producing anyhydrous rare earth chlorids which consists in adding ammonium chlorid to a solution of the rare earth chlorids, crystallizing out the mixed chlorids, evaporating to dryness, and slowly raising the temperature to substantially red heat in the presence of a current of hydrogen chlorid until all of the ammonium chlorid has been driven off.

In witness whereof, I hereunto subscribe my name this 15th day of September, 1917.

CLARENCE W. BALKE.

Witnesses:
L. SCHUMANN,
J. C. BAKER.